United States Patent
Park et al.

(10) Patent No.: US 9,599,862 B2
(45) Date of Patent: Mar. 21, 2017

(54) DISPLAY APPARATUS

(71) Applicant: Samsung Display Co., Ltd., Yongin, Gyeonggi-Do (KR)

(72) Inventors: Eun-Kil Park, Cheonan-si (KR); UnByoll Ko, Gyeonggi-do (KR); Kikyung Youk, Bucheon-si (KR)

(73) Assignee: SAMSUNG DISPLAY CO., LTD. (KR)

( * ) Notice: Subject to any disclaimer, the term of this patent is extended or adjusted under 35 U.S.C. 154(b) by 0 days.

(21) Appl. No.: 14/273,909

(22) Filed: May 9, 2014

(65) Prior Publication Data

US 2015/0131044 A1 May 14, 2015

(30) Foreign Application Priority Data

Nov. 14, 2013 (KR) .......................... 10-2013-0138432

(51) Int. Cl.
 *G02F 1/1339* (2006.01)
(52) U.S. Cl.
 CPC .. *G02F 1/1339* (2013.01); *G02F 2001/13398* (2013.01)
(58) Field of Classification Search
 CPC .. G02F 1/1339; G02F 1/13398; G02F 1/1362; G02F 1/136286; B32B 7/14; B32B 38/145; B32B 27/08
 USPC ................................................. 349/153, 190
 See application file for complete search history.

(56) References Cited

U.S. PATENT DOCUMENTS

| | | | |
|---|---|---|---|
| 6,573,957 B1 | 6/2003 | Suzuki | |
| 7,830,490 B2 | 11/2010 | Park | |
| 8,199,272 B2 | 6/2012 | Wang et al. | |
| 8,379,179 B2 | 2/2013 | Kim et al. | |
| 2002/0063837 A1* | 5/2002 | Lee ................... | G02F 1/133351 349/153 |
| 2003/0086050 A1* | 5/2003 | Lee ...................... | G02F 1/1339 349/153 |
| 2008/0123042 A1* | 5/2008 | Tashiro et al. ................ 349/153 | |
| 2010/0091233 A1 | 4/2010 | Yamagishi | |
| 2012/0012890 A1 | 1/2012 | Lee et al. | |
| 2013/0077032 A1 | 3/2013 | Chen et al. | |
| 2013/0100392 A1 | 4/2013 | Fukushima | |
| 2013/0180653 A1* | 7/2013 | Kim .................. | G02F 1/133305 156/257 |

(Continued)

FOREIGN PATENT DOCUMENTS

| | | |
|---|---|---|
| JP | 56149018 A * | 11/1981 |
| JP | 2007178706 A * | 7/2007 |

(Continued)

*Primary Examiner* — Hoan C Nguyen
(74) *Attorney, Agent, or Firm* — Cantor Colburn LLP

(57) ABSTRACT

A display apparatus includes a first substrate including a display area in which a plurality of pixels is disposed and a non-display area disposed adjacent to the display area, a second substrate which faces the first substrate, an image display layer between the first substrate and the second substrate, and a sealing member which is in the non-display area and attaches the first substrate and the second substrate. The first and second substrates have a curved surface in a first direction, and a flat surface in a second direction crossing the first direction A width of the sealing member extended in the first direction is greater than a width of the sealing member extended in the second direction.

18 Claims, 7 Drawing Sheets

(56) References Cited

U.S. PATENT DOCUMENTS

2013/0273360 A1* 10/2013 Chen et al. ............... 428/354
2013/0335686 A1* 12/2013 Chen ................... G02F 1/1335
  349/106
2014/0168916 A1* 6/2014 Nagaoka et al. ............ 361/752

FOREIGN PATENT DOCUMENTS

| KR | 1020050035423 A | 4/2005 |
| KR | 1020060083703 A | 7/2006 |
| KR | 1020070068231 A | 6/2007 |

* cited by examiner

DISPLAY APPARATUS

This application claims priority to Korean Patent Application No. 10-2013-0138432, filed on Nov. 14, 2013, and all the benefits accruing therefrom under 35 U.S.C. §119, the contents of which are hereby incorporated by reference in its entirety.

BACKGROUND

1. Field

The invention relates to a display apparatus. More particularly, the invention relates to a display apparatus capable of preventing an edge thereof from being stained.

2. Description of the Related Art

In general, a display apparatus includes a display panel to display an image and a backlight unit to supply light to the display panel.

The display panel includes a first substrate including a plurality of pixels, a second substrate disposed to face the first substrate, and an image display layer interposed between the first and second substrates. The image display layer is driven by the pixels and a light transmittance is controlled by the image display layer, thereby displaying desired images. The image display layer includes a liquid crystal layer, an electrowetting layer or an electrophoretic layer.

The display apparatus has generally had a flat shape, but a display apparatus having a curved shape has been developed. The display apparatus having the curved shape is manufactured by deforming the display apparatus having the flat shape into the display apparatus having the curved shape and accommodating the display apparatus into a case having a curved shape.

SUMMARY

One or more exemplary embodiment of the invention provides a display apparatus capable of preventing an edge of a display area thereof from being stained.

An exemplary embodiment of the invention provides a display apparatus including a first substrate including a display area in which a plurality of pixels is disposed and a non-display area adjacent to the display area, a second substrate which faces the first substrate, an image display layer between the first substrate and the second substrate, and a sealing member which is in the non-display area and attaches the first substrate and the second substrate. The first and second substrates have a curved surface in a first direction and a flat surface in a second direction crossing the first direction. A width of the sealing member extended in the first direction is greater than a width of the sealing member extended in the second direction.

In an exemplary embodiment, the sealing member may include a plurality of first sealing member portions in the non-display area adjacent to upper and lower portions of the display area and extending in the first direction, and a plurality of second sealing member portions in the non-display area adjacent to left and right portions of the display area, extending in the second direction and connected to end portions of the first sealing member portions. Widths of the first sealing member portions may be greater than widths of the second sealing member portions.

In an exemplary embodiment, a single one of the first sealing member portions may be in the non-display area adjacent to the upper portion of the display area, a single one of the first sealing member portions may be in the non-display area adjacent to the lower portion of the display area, a single one of the second sealing member portions may be in the non-display area adjacent to the left portion of the display area, and a single one of the second sealing member portions may be in the non-display area adjacent to the right portion of the display area.

In an exemplary embodiment, the first sealing member portions may have a same width.

In an exemplary embodiment, the first sealing member portions may have different widths.

In an exemplary embodiment, a ratio of a first width of a single first sealing member portions to a second width of a single second sealing member portions may be in a range of about 1.2:1 to about 2.0:1.

The first width may be about 1.2 millimeters (mm) to about 2.0 mm, and the second width may be about 1 mm.

According to one or more exemplary embodiment, a curved display apparatus having a sealing member with different widths in the curved and non-curved directions, may reduce or effectively prevent a stain from occurring in boundaries of a display area thereof.

BRIEF DESCRIPTION OF THE DRAWINGS

The above and other advantages of the invention will become readily apparent by reference to the following detailed description when considered in conjunction with the accompanying drawings wherein.

DETAILED DESCRIPTION

Figure 1:
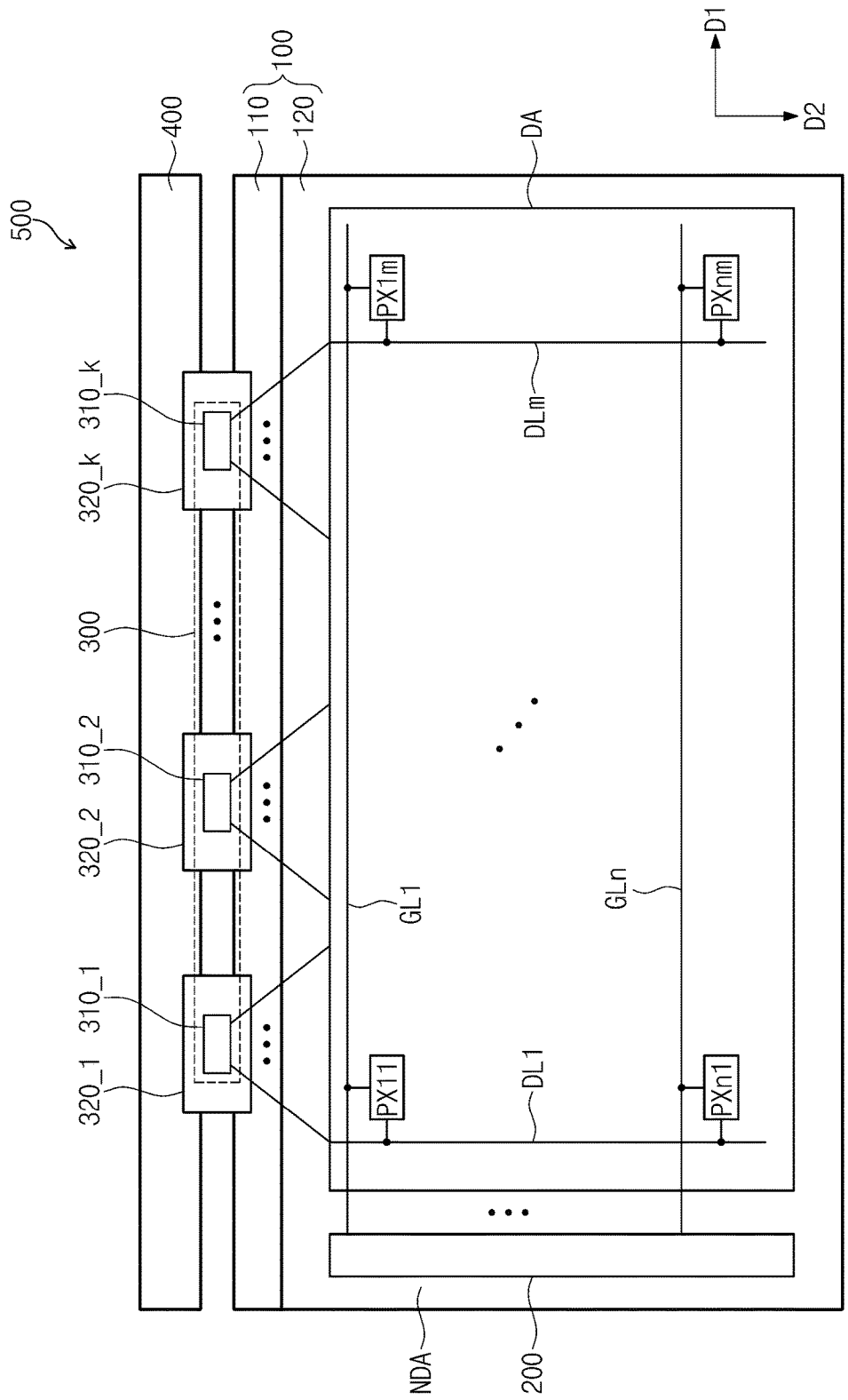
FIG. 1 is a plan view showing an exemplary embodiment of a display apparatus according to the invention.

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

It will be understood that when an element or layer is referred to as being "on," or "connected to" another element or layer, it can be directly on or connected to the other element or layer or intervening elements or layers may be present. In contrast, when an element is referred to as being "directly on" or "directly connected to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "lower," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a," "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the invention will be explained in detail with reference to the accompanying drawings.

Figure 2:
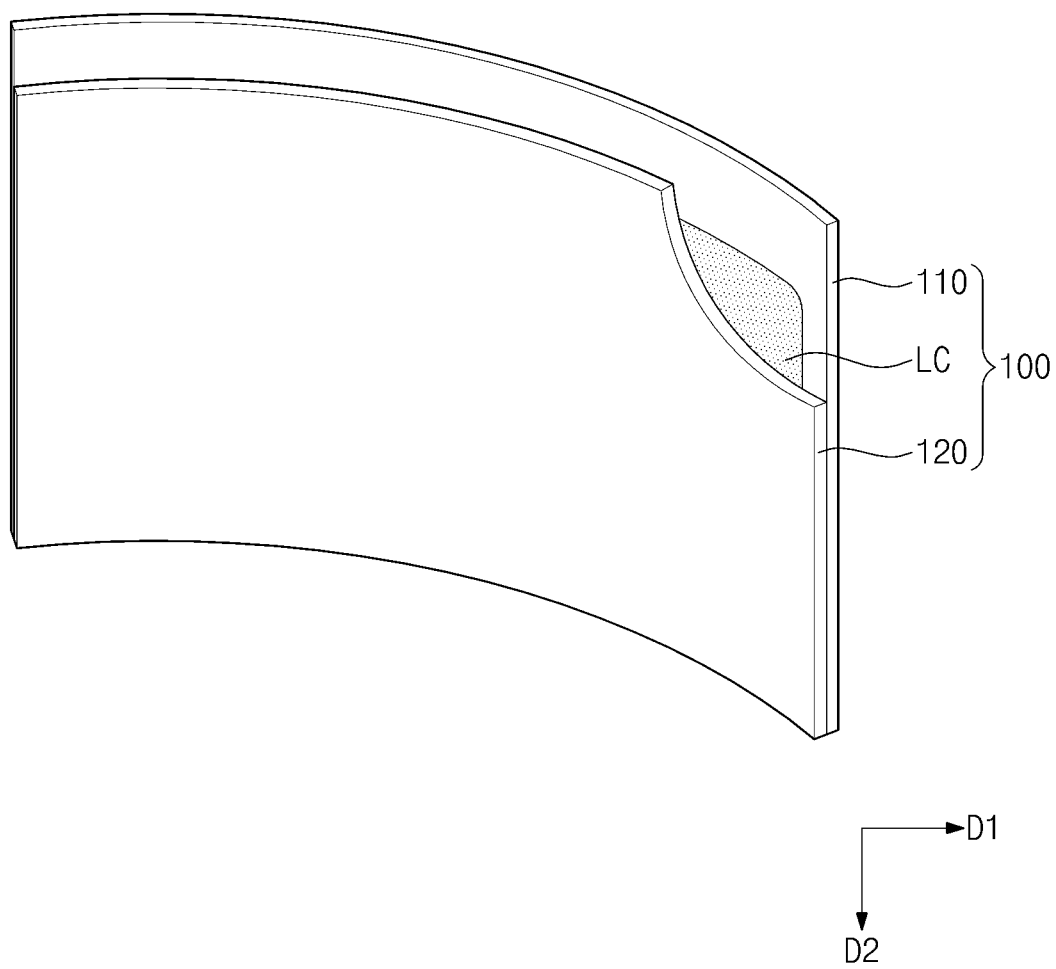
FIG. 2 is a perspective view showing an exemplary embodiment of a display panel in the display apparatus of FIG. 1.

FIG. 1 is a plan view showing an exemplary embodiment of a display apparatus according to the invention and FIG. 2 is a perspective view showing of an exemplary embodiment of a display panel in the display apparatus of FIG. 1.

Referring to FIGS. 1 and 2, a display apparatus 500 includes a display panel 100, a gate driver 200, a data driver 300 and a driving circuit board 400.

The display panel 100 has long sides extended in a first direction D1 and short sides extended in a second direction D2 crossing the first direction D1. The first direction D1 may be substantially perpendicular to the second direction D1. The display panel 100 includes a display area DA, and a non-display area NDA surrounding the display area DA, when viewed in a plan view such as a top plan view.

As shown in FIG. 2, the display panel 100 has a curved surface extended in the first direction D1 and a flat surface extended in the second direction D1. For instance, in an exemplary embodiment of manufacturing a display apparatus, the display panel 100 is manufactured to have a flat shape, and then curved in the first direction D1 to have a predetermined curvature. That is, the display panel 100 is a curved display panel.

The display panel 100 includes a first substrate 110, a second substrate 120 disposed to face the first substrate 110, and an image display layer LC interposed between the first substrate 110 and the second substrate 120.

The first and second substrates 110 and 120 have the long sides extended in the first direction D1 and the short sides extended in the second direction D1. The first and second substrates 110 and 120 each have the curved surface in the first direction D1 and the flat surface in the second direction D1. The first substrate 110 includes a display area DA, and a non-display area NDA surrounding the display area DA, which correspond to those of the overall display panel 100.

As an example, the image display layer LC shown in FIG. 2 may be a liquid crystal layer, but the invention is not limited to the liquid crystal layer. That is, the image display layer LC may be an electrowetting layer or an electrophoretic layer. Hereinafter, in exemplary embodiments of the invention, the liquid crystal layer will be described as the image display layer LC.

The first and second substrates 110 and 120 are attached to each other by a sealing member provided in the non-display area NDA. The sealing member will be described in detail with reference to FIGS. 3 to 5.

The display panel 100 includes a plurality of pixels PX11 to PXnm, a plurality of gate lines GL1 to GLn, and a plurality of data lines DL1 to DLm, which are disposed on the first substrate 110. The pixels PX11 to PXnm are arranged in a matrix form and disposed in the display area DA. As illustrated in FIG. 1, for instance, the pixels PX11 to PXnm are arranged in "n" rows by "m" columns crossing each other. In the illustrated exemplary embodiment, each of "m" and "n" is an integer number greater than 0.

The gate lines GL1 to GLn are insulated from the data lines DL1 to DLm while crossing the data lines DL1 to DLm. The gate lines GL1 to GLn are connected to the gate driver 200 to sequentially receive gate signals from the gate driver 200. The data lines DL1 to DLm are connected to the data driver 300 to receive data voltages such as in analog form from the data driver 300.

Each of the pixels PX11 to PXnm is connected to a corresponding gate line of the gate lines GL1 to GLn and a corresponding data line of the data lines DL1 to DLm. The pixels PX11 to PXnm receive the data voltages through the data lines DL1 to DLm in response to the gate signals applied through the gate lines GL1 to GLn.

The pixels PX11 to PXnm display gray scales corresponding to the data voltages. In detail, each of the pixels PX11 to PXnm disposed in the display area DA of the first substrate 110 includes a pixel electrode (not shown), and a thin film transistor ("TFT") (not shown) connected to the pixel electrode. The second substrate 120 includes a common electrode (not shown).

The TFT receives the corresponding data voltage in response to the corresponding gate signal and applies the received data voltage to the pixel electrode. The pixel electrode is applied with the data voltage and the common electrode is applied with the common voltage.

Due to a voltage difference between the data voltage and the common voltage, an electric field is formed between the pixel electrode and the common electrode. An arrangement of liquid crystal molecules of the liquid crystal layer LC is changed and a transmittance of light passing through the liquid crystal layer LC by the arrangement of the liquid crystal molecules, thereby displaying desired images.

The gate driver 200 is disposed in a portion of the non-display area NDA disposed adjacent to one side of the display area DA. In detail, as illustrated in FIG. 1, the gate driver 200 is disposed on the first substrate 110 in an amorphous silicon TFT gate driver circuit ("ASG") form in the portion of the non-display area NDA adjacent to a left side of the display area DA in the plan view.

Different from the above, the gate driver 200 may include a plurality of gate driving chips. The gate driving chips may be mounted on gate flexible printed circuit boards and connected to the first substrate 110 in the portion of the non-display area NDA adjacent to the left side of the display area DA.

The gate driver 200 generates the gate signals in response to a gate control signal applied from a timing controller (not shown), which is mounted on the driving circuit board 400. The gate signals are sequentially applied to the pixels PX11 to PXnm through the gate lines GL1 to GLn in the unit of a row among rows of the matrix form. Thus, the pixels PX11 to PXnm are driven in the unit of a row.

The data driver 300 receives image signals and a data control signal from the timing controller. The data driver 300 generates the data voltages in analog form, which correspond to the image signals, in response to the data control signal. The data driver 300 applies the data voltages to the pixels PX11 to PXnm through the data lines DL1 to DLm.

The data driver 300 includes a plurality of source driving chips 310_1 to 310_k. In the illustrated exemplary embodiment, "k" is an integer number greater than 0 and smaller than "m". Each of the source driving chips 310_1 to 310_k is mounted on a corresponding source flexible circuit board among source flexible circuit boards 320_1 to 320_k and connected between the driving circuit board 400 and the first substrate 110 in a portion of the non-display area NDA disposed adjacent to an upper portion of the display area DA. That is, the data driver 300 may be connected to the display panel 100 in a tape carrier package ("TCP") manner.

However, the invention is not limited to the above-described configurations. That is, the source driving chips 310_1 to 310_k may be mounted on the first substrate 110 in the portion of the non-display area NDA disposed adjacent to the upper portion of the display area DA in a chip on glass ("COG") manner.

Figure 3:
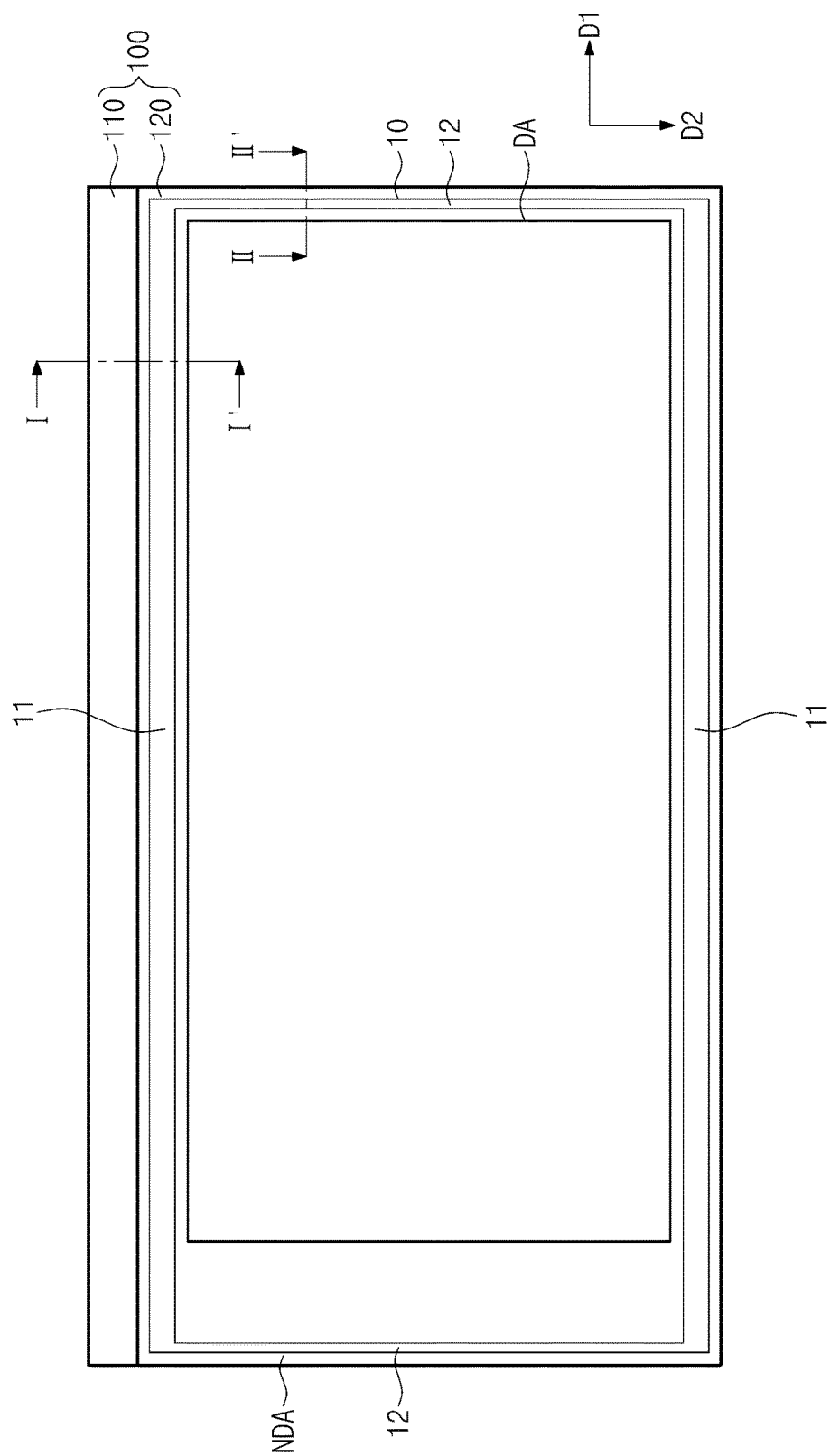
FIG. 3 is a perspective view showing an exemplary embodiment of a sealing member in the display panel shown in FIG. 2.
Figure 4:
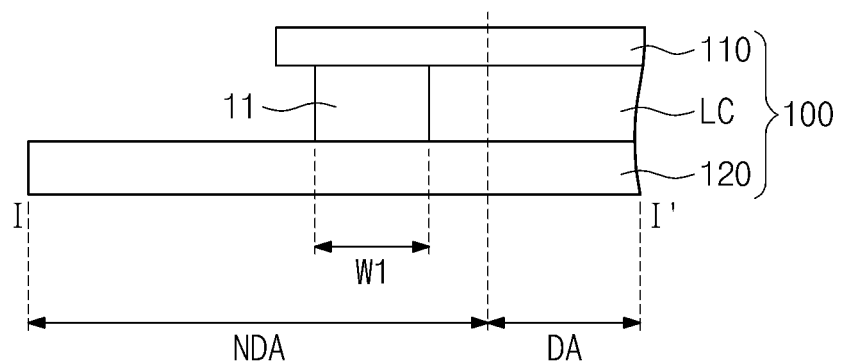
FIG. 4 is a cross-sectional view taken along line I-I' shown in FIG. 3.
Figure 5:
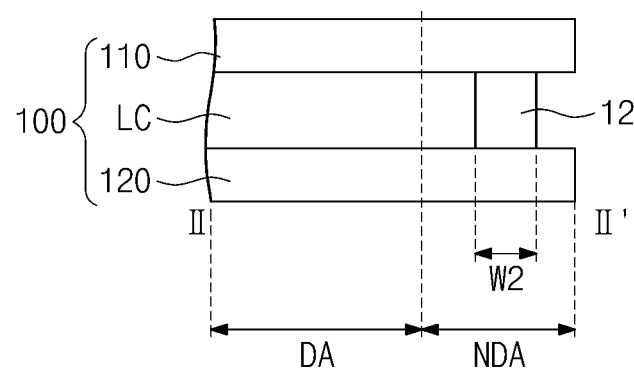
FIG. 5 is a cross-sectional view taken along line II-II' shown in FIG. 3.

FIG. 3 is a perspective view showing an exemplary embodiment of the sealing member in the display panel shown in FIG. 2, FIG. 4 is a cross-sectional view taken along line I-I' shown in FIG. 3, and FIG. 5 is a cross-sectional view taken along line II-II' shown in FIG. 3.

For the convenience of explanation, the pixels PX11 to PXnm, the gate line GL1 to GLn, and the data lines DL1 to DLm of the display panel 100 are not shown in FIG. 3.

Referring to FIGS. 3, 4 and 5, the liquid crystal layer LC is disposed between the first and second substrates 110 and 120 in a cross-sectional thickness direction. A sealing member 10 is disposed in the non-display area NDA of the first substrate 110 to surround the display area DA. The sealing member 10 may be a single, unitary, indivisible member, but the invention is not limited thereto.

As described above, the display panel 100 has the curved surface in the first direction D1 and the flat surface in the second direction D1. A width in the first direction D1 of the sealing member 10 is greater than a width in the second direction D2 of the sealing member 10.

In detail, the sealing member 10 includes a plurality of first sealing member portions 11 and a plurality of second sealing member portions 12. The first sealing member portions 11 are disposed in the non-display area NDA adjacent to the upper and lower portions of the display area DA in the plan view, and extend in the first direction D1. The number of the first sealing member portions 11 in the illustrated exemplary embodiment is two. One of the first sealing member portions 11 is disposed in the non-display area NDA adjacent to the upper portion of the display area DA and the other one of the first sealing member portions 11 is disposed in the non-display area NDA adjacent to the lower portion of the display area DA. That is, a single one of the first sealing member portions 11 is disposed adjacent to the upper portion and a single one of the first sealing member portions 11 is disposed adjacent to the lower portion, of the display area DA in the plan view.

The second sealing member portions 12 are disposed in the non-display area NDA adjacent to the left and right portions of the display area DA in the plan view, and extend in the second direction D1. The number of the second sealing member portions 12 is two. One of the second sealing member portions 12 is disposed in the non-display area NDA adjacent to the left portion of the display area DA and the other one of the second sealing member portions 12 is disposed in the non-display area NDA adjacent to the right portion of the display area DA. A width of a sealing member portion is taken perpendicular to an extension direction of the sealing member portion.

Widths of the first sealing member portions 11 may be greater than widths of the second sealing member portions 12. In the illustrated exemplary embodiment, for instance, the width of each of the first sealing member portions 11 is referred to as a first width W1 as shown in FIG. 4 and the width of each of the second sealing member portions 12 is referred to as a second width W2. The first width W1 is greater than the second width W2.

The first sealing member portions 11 may have the same width. In detail, the width W1 of the first sealing member portion 11 disposed in the non-display area NDA adjacent to the upper portion of the display area DA may be equal to the width W1 of the first sealing member portion 11 disposed in the non-display area NDA adjacent to the lower portion of the display area DA, but the invention is not limited thereto. That is, the first sealing member portions 11 may have different widths.

When the display panel 100 is manufactured in an exemplary embodiment, the sealing member 10 is disposed in the non-display area NDA, and the first substrate 110 maintained in a flat state and the second substrate 120 maintained in a flat state are attached to each other via the sealing member 10. Since the sealing member 10 is cured to fix the first and second substrates 110 and 120 to each other, the display panel 100 is manufactured in the flat state. The cured sealing member 10 is formed by curing sealing member material having fluidity.

To further manufacture the curved display panel 100 in an exemplary embodiment, the display panel 100 in the flat state may be deformed to be curved in the first direction D1 and have the predetermined curvature in the first direction D1. That is, an external force is applied to the flat state display panel 100 to deform the display panel 100 to have the curvature in the first direction D1.

In applying the external force, a stress is applied to areas in which the cured sealing member 10 makes contact with the first and second substrates 110 and 120.

A photoelasticity phenomenon occurs due to the stress. The photoelasticity phenomenon causes a double refraction when an elastic body is deformed by the external force. The double refraction means that lights incident to crystalline materials are refracted to generate two different refraction lights. Due to the double refraction, a phase retardation occurs.

As the areas in which the cured sealing member 10 makes contact with the first and second substrates 110 and 120 in the first direction D1 become smaller, the stress may be concentrated in the contact areas. That is, as the contact areas become smaller, the stress per unit area becomes greater. Accordingly, as the areas in which the cured sealing member 10 makes contact with the first and second substrates 110 and 120 in the first direction D1 become smaller, the stress becomes greater.

In a conventional display panel, the first and second sealing member portions 11 and 12 have the same width. Since the first and second sealing member portions 11 and 12 have the same width, the stress applied to areas in which the cured sealing member 10 makes contact with the first and second substrates 110 and 120 in the first direction D1 exerts influences on upper and lower boundaries of the display area DA. That is, the double refraction phenomenon occurs in the upper and lower boundaries of the display area DA of the conventional display panel.

Due to the double refraction phenomenon in the conventional display panel, the image is not normally displayed in the upper and lower boundaries of the display area DA and a stain occurs in the upper and lower boundaries of the display area DA.

In one or more exemplary embodiment of the invention, however the first width W1 of each of the first sealing member portions 11 is greater than the second width W2 of each of the second sealing member portions 12. Since the areas in which the cured sealing member 10 makes contact with the first and second substrates 110 and 120 are increased greater, the stress is distributed. That is, as the contact areas increase, the stress per unit area becomes smaller.

Therefore, as the areas in which the cured sealing member 10 makes contact with the first and second substrates 110 and 120 become greater, the stress becomes smaller. Since the stress becomes smaller, the double refraction phenomenon may be reduced or effectively prevented and recognition of the stain in the upper and lower boundaries of the display area DA may be reduced or effectively prevented.

Consequently, the exemplary embodiment of the display apparatus 500 according to the invention may reduce or effectively prevent the stain from occurring in the boundaries of the display area DA.

Figure 6:
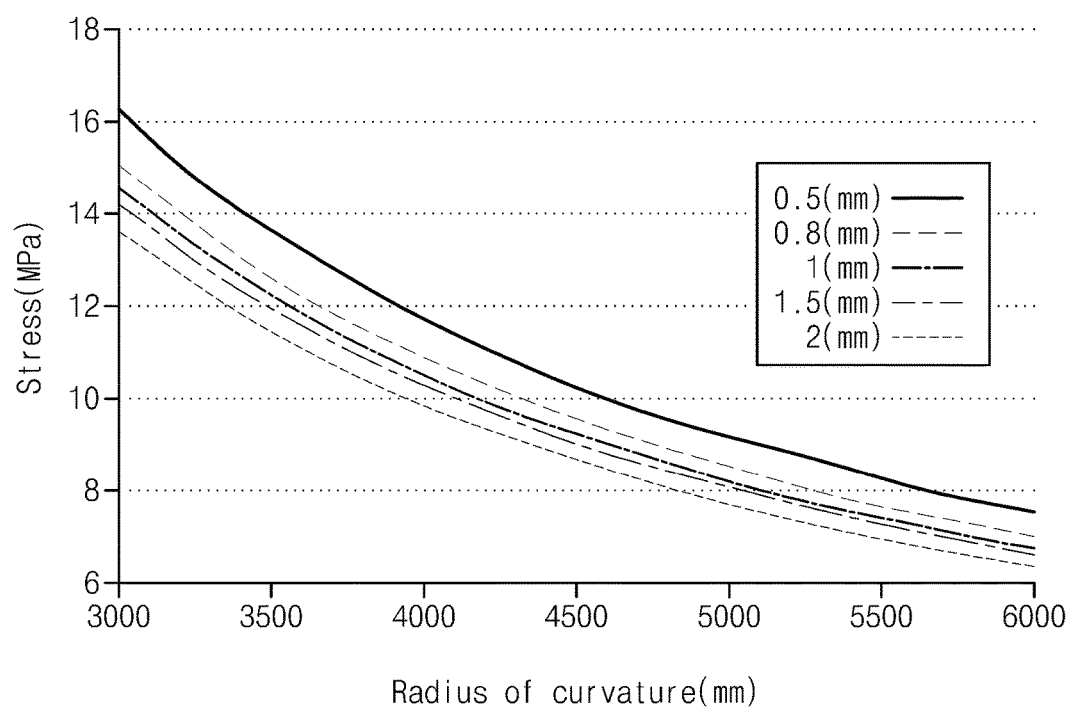
FIG. 6 is a graph showing a test result of stress (megapascals: MPa) according to variations in width (millimeters: mm) of first sealing member portions shown in FIG. 3 and a radius of curvature (millimeters: mm))

FIG. 6 is a graph showing a test result of stress according to variations in width of the first sealing member portions shown in FIG. 3 and a radius of curvature.

Although not shown in figures, each of the second sealing member portions 12 has the width of about 1 millimeter (mm). In FIG. 6, a horizontal axis indicates the radius of curvature of the display panel 100 having the curved surface in the first direction D1. A unit of measure for the radius of curvature is millimeter (mm). As an example, a graph shown in FIG. 6 represents a stress test result of the display panel 100 having a size of about 55 inches.

In FIG. 6, a vertical axis indicates the stress in the areas in which the cured sealing member 10 makes contact with the first and second substrates 110 and 120 in the first direction D1. A unit of the stress is mega-Pascal (MPa).

Referring to FIG. 6, as the radius of curvature of the display panel 100 becomes larger, the stress is reduced. The radius of curvature is a variation rate that represents a curved degree of the curved surface. As the radius of curvature becomes larger, the display panel 100 is slightly curved in the first direction D1, and as the radius of curvature becomes smaller, the display panel 100 is greatly curved in the first direction D1.

In other words, as the radius of curvature becomes smaller, the external force applied to the display panel 100 becomes greater. In addition, as the radius of curvature becomes larger, the external force applied to the display panel 100 becomes smaller.

The stress of the display panel 100 is tested at the widths of about 0.5 mm, 0.8 mm, 1 mm, 1.5 mm and 2 mm in the first sealing member portions 11. As shown in FIG. 6, as the widths of the first sealing member portions 11 are increased, the stress becomes smaller.

The stress values according to the test result shown in FIG. 6 are shown in the following Table 1. Table 1 indicates the stress values according to the test result of the display panel 100 having the curved surface in the first direction D1. As an example, the stress values according to the first sealing member portions 11 having the widths of about 0.5 mm, 0.8 mm, 1 mm, 1.5 mm and 2 mm and the radius of curvature of about 3000 mm, 4000 mm and 5000 mm are shown in Table 1.

TABLE 1

| | | Width of first sealing member (mm) | | | | |
|---|---|---|---|---|---|---|
| | | 2 | 1.5 | 1 | 0.8 | 0.5 |
| Radius of curvature (mm) | 3000 | 13.7(MPa) | *14.3 (MPa)* | *14.6 (MPa)* | *15.0 (MPa)* | *16.2 (MPa)* |
| | 4000 | 10.1(MPa) | 10.5(MPa) | *10.7 (MPa)* | *11.3 (MPa)* | *12.3 (MPa)* |
| | 5000 | 7.7(MPa) | 8.1(MPa) | 8.1(MPa) | *8.4 (MPa)* | *9.1 (MPa)* |

Referring to Table 1, as the width of the first sealing member 11 is increased, the stress is reduced at the radius of curvatures of about 3000 mm, 4000 mm and 5000 mm. The stain occurs at the stress values in Table 1, which is represented in bold italicized text.

The stain does not occur at the stress values according to the first sealing member portion 11 having the width of about 2 mm and the radius of curvature of about 3000 mm, 4000 mm and 5000 mm. The stain does not occur at the stress values according to the first sealing member portion 11 having the width of about 1.5 mm and the radius of curvature of about 4000 mm and 5000 mm. The stain does not occur at the stress values according to the first sealing member portion 11 having the width of about 1 mm and the radius of curvature of about 5000 mm.

Table 2 shows the stress values according to the test result of the display panel 100 having the curved surface in the first direction D1 and the size of about 46 inches. As an example, the stress values according to the first sealing member portions 11 having the widths of about 0.5 mm, 0.8 mm, 1 mm, 1.5 mm and 2 mm and the radius of curvature of about 3000 mm, 4000 mm and 5000 mm are shown in Table 2.

TABLE 2

|  |  | Width of first sealing member (mm) | | | | |
| --- | --- | --- | --- | --- | --- | --- |
|  |  | 2 | 1.5 | 1 | 0.8 | 0.5 |
| Radius of curvature (mm) | 3000 | 11.4(MPa) | *12.0 (MPa)* | *12.2 (MPa)* | *12.4 (MPa)* | *13.5 (MPa)* |
|  | 4000 | 8.4(MPa) | 8.7(MPa) | *9.0 (MPa)* | *9.4 (MPa)* | *10.2 (MPa)* |
|  | 5000 | 6.6(MPa) | 6.8(MPa) | 7.0(MPa) | *7.2 (MPa)* | *8.0 (MPa)* |

Referring to FIG. 2, as the width of the first sealing member portion 11 is increased, the stress is reduced at the radius of curvatures of about 3000 mm, 4000 mm and 5000mm. The stain occurs at the stress values in Table 2, which is represented in bold italicized text.

The stain does not occur at the stress values according to the first sealing member portion 11 having the width of about 2 mm and the radius of curvature of about 3000 mm, 4000 mm and 5000 mm. The stain does not occur at the stress values according to the first sealing member portion 11 having the width of about 1.5 mm and the radius of curvature of about 4000 mm and 5000 mm. The stain does not occur at the stress values according to the first sealing member portion 11 having the width of about 1 mm and the radius of curvature of about 5000 mm.

According to the test result, when the second width W2 of the second sealing member portion 12 is about 1 mm, the first width W1 of the first sealing member portion 11 may be set to have the width of about 1.2 mm to about 2.0 mm to reduce or effectively prevent the stain from occurring in the boundaries of the display area DA. That is, a ratio of the first width W1 of the first sealing member portion 11 to the second width W2 of the second sealing member portion 12 is in a range from about 1.2:1 to about 2.0:1. For example, the ratio of the first width W1 of the first sealing member portion 11 to the second width W2 of the second sealing member portion 12 described above may range with a certain percentage (%) of the stated values of 1.2:1 to about 2.0:1, such that the first width W1 is about 1.2 mm to about 2.0 mm and the second width W2 is about 1 mm.

Figure 7:
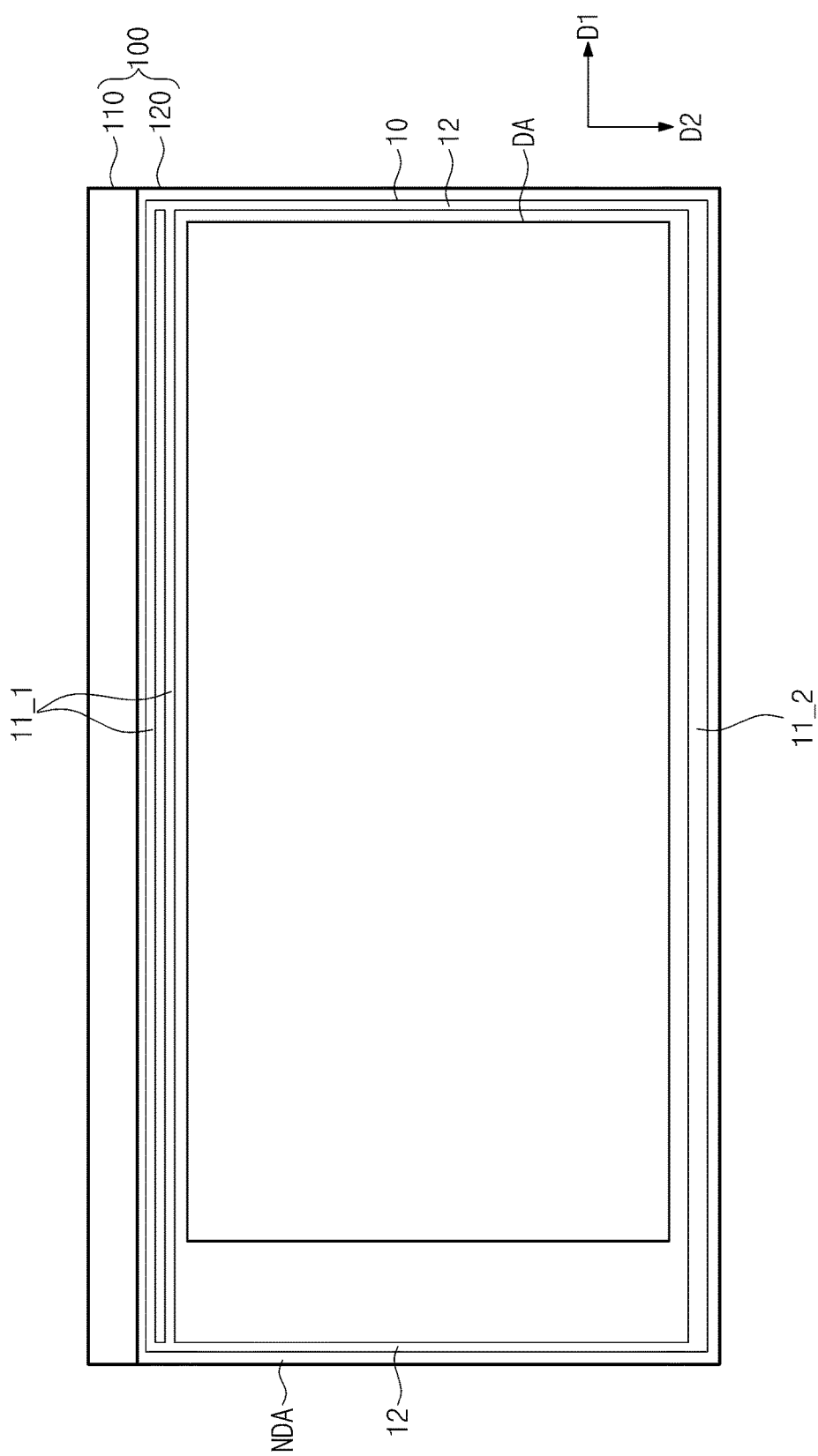
FIG. 7 is a plan view showing another exemplary embodiment of an arrangement of a sealing member in a display panel of a display apparatus according to the invention.

FIG. 7 is a plan view showing another exemplary embodiment of an arrangement of a sealing member in a display panel of a display apparatus according to the invention.

The display apparatus in the exemplary embodiment of FIG. 7 has the same structure and function as those of the display apparatus in the exemplary embodiment of FIG. 3, except for the sealing member 10. Thus, hereinafter only the sealing member 10 will be described in detail.

Referring to FIG. 7, the sealing member 10 includes a plurality of first sealing member portions 11 and a plurality of second sealing member portions 12. The first sealing member portions 11 are disposed in the non-display area NDA adjacent to the upper and lower portions of the display area DA in the plan view, and extend in the first direction D1. The structure of the second sealing member portions 12 is the same as the structure of the second sealing member portions 12 shown in FIG. 3, and thus details thereof will be omitted.

The first sealing member portions 11 collectively include a plurality of first sub-sealing members 11_1 and a second sub-sealing member 11_2. The first sub-sealing members 11_1 are disposed in the non-display area NDA adjacent to the upper portion of the display area DA. The second sub-member 11_2 is disposed in the non-display area NDA adjacent to the lower portion of the display area DA.

A sum of widths of the first sub-sealing members 11_1 and a width of the second sub-sealing member 11_2 are greater than widths of the second sealing member portions 12.

FIG. 7 shows two first sub-sealing members 11_1, but the number of the first sub-sealing members 11_1 should not be limited to two. In an exemplary embodiment, the number of the first sub-sealing members 11_1 may be greater than two.

As shown in FIG. 7, a width of an individual first sub-sealing member 11_1 may be equal to a width of a second sealing member portions 12, but the invention is not limited thereto or thereby. That is, the widths of the first sub-sealing members 11_1 may be greater or smaller than the widths of the second sealing member portions 12.

In the illustrated exemplary embodiment, the sum of the widths of the first sub-sealing members 11_1 and the width of the second sub-sealing member 11_2 are greater than the widths of the second sealing member portions 12. Therefore, the contact areas in which the cured sealing member 10 makes contact with the first and second substrates 110 and 120 in the first direction D1 are increased, and thus the stress is distributed. Since the stress is distributed and therefore reduced, the double refraction phenomenon is reduced or effectively prevented and recognition of the stain in the upper and lower portions of the display area is reduced or effectively prevented.

Consequently, the exemplary embodiment of the display apparatus in FIG. 7 may reduce or effectively prevent the stain from occurring in the boundaries of the display area DA.

Figure 8:
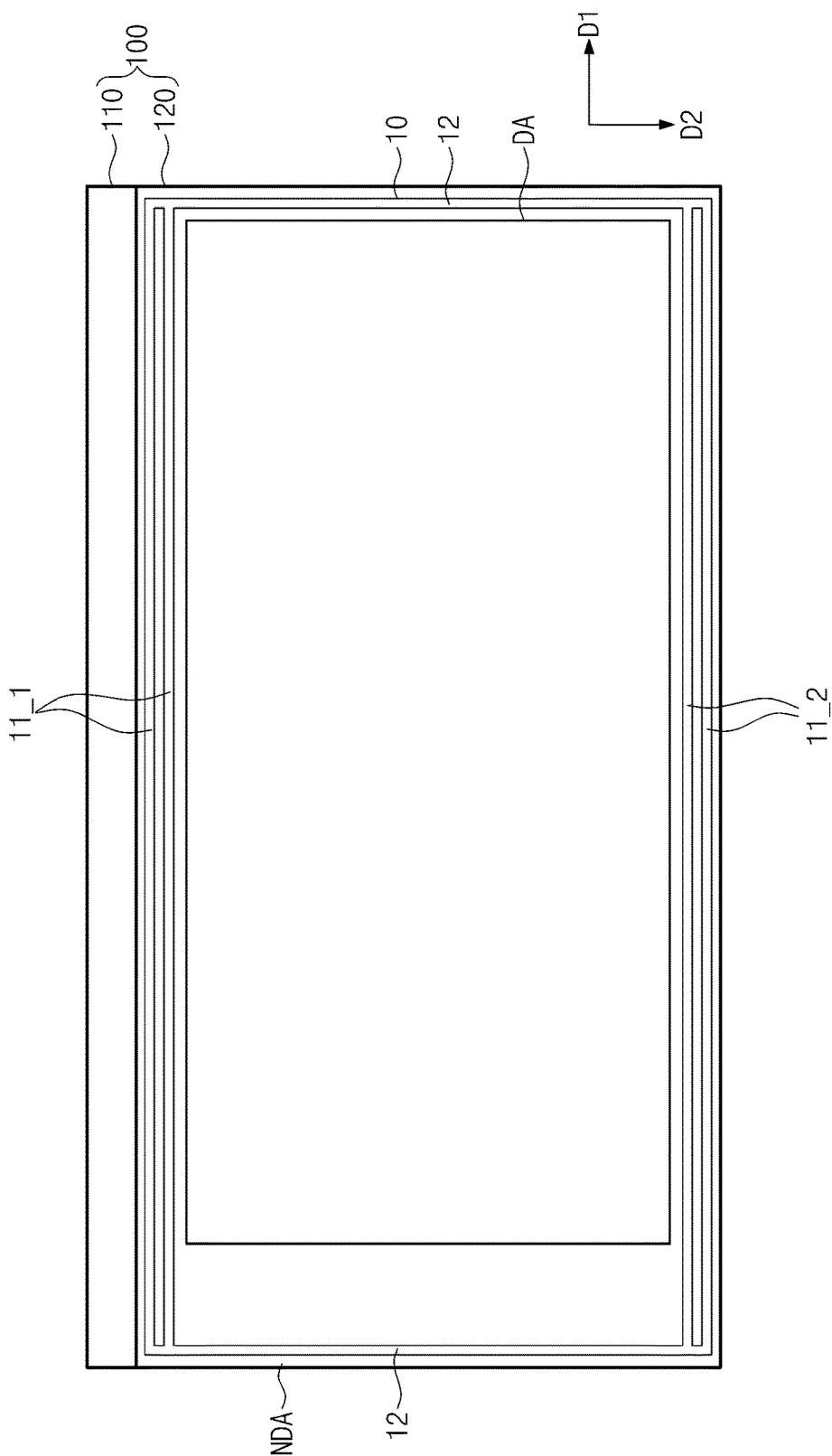
FIG. 8 is a plan view showing still another exemplary embodiment of an arrangement of a sealing member in a display panel of a display apparatus according to the invention.

FIG. 8 is a plan view showing still another exemplary embodiment of an arrangement of a sealing member in a display panel of a display apparatus according to the invention.

The display apparatus in the exemplary embodiment of FIG. 8 has the same structure and function as those of the display apparatus 500 in the exemplary embodiment of FIG. 3, except for the sealing member 10. Thus, hereinafter only the sealing member 10 will be described in detail.

Referring to FIG. 8, the sealing member 10 includes a plurality of first sealing member portions 11 and a plurality of second sealing member portions 12. The structure of the second sealing member portions 12 is the same as the structure of the second sealing member portions 12 shown in FIG. 3, and thus details thereof will be omitted.

The first sealing member portions 11 collectively include a plurality of first sub-sealing members 11_1 and a plurality of second sub-sealing members 11_2. The first sub-sealing members 11_1 are disposed in the non-display area NDA adjacent to the upper portion of the display area DA. The second sub-members 11_2 are disposed in the non-display area NDA adjacent to the lower portion of the display area DA.

A sum of widths of the first sub-sealing members 11_1 and a sum of widths of the second sub-sealing member 11_2 are greater than widths of the second sealing member portions 12.

FIG. 8 shows two first sub-sealing members 11_1 and two second sub-sealing members 11_2, but the number of the first and second sub-sealing members 11_1 and 11_2 is not limited to two. In an exemplary embodiment, the number of each of the first and second sub-sealing members 11_1 and 11_2 may be greater than two. In addition, the number of the first sub-sealing members 11_1 may be greater than the number of the second sub-sealing members 11_2.

As shown in FIG. 8, a width of an individual first and/or second sub-sealing members 11_1 and/or 11_2 may be equal to a width of an individual second sealing member portion 12, but the invention is not limited thereto or thereby. That is, the widths of the first and second sub-sealing members 11_1 and 11_2 may be greater or smaller than the widths of the second sealing member portions 12.

In the illustrated exemplary embodiment, the sum of the widths of the first sub-sealing members 11_1 and the sum of the widths of the second sub-sealing members 11_2 are greater than the widths of the second sealing member portions 12. Therefore, the contact areas in which the cured sealing member 10 makes contact with the first and second substrates 110 and 120 in the first direction D1 is increased, and thus the stress is distributed. Since the stress is distributed and therefore reduced, the double refraction phenomenon is reduced or effectively prevented and recognition of the stain in the upper and lower portions of the display area DA is reduced or effectively prevented.

Consequently, the exemplary embodiment of the display apparatus in FIG. 8 may reduce or effectively prevent the stain from occurring in the boundaries of the display area DA.

Although exemplary embodiments of the invention have been described, it is understood that the invention should not be limited to these exemplary embodiments but various changes and modifications can be made by one ordinary skilled in the art within the spirit and scope of the invention as hereinafter claimed.

What is claimed is:

1. A display apparatus comprising:
    a first substrate comprising a display area in which a plurality of pixels is disposed, and a non-display area adjacent to the display area;
    a second substrate which faces the first substrate;
    an image display layer between the first substrate and the second substrate; and
    a sealing member which is disposed in the non-display area and attaches the first substrate and the second substrate,
    wherein
    the first and second substrates are curved with respect to a first direction, and are flat in a second direction crossing the first direction, and
    the sealing member comprises:
        a plurality of first sealing portions extending in the first direction in which the first and second substrates are curved, adjacent to upper and lower portions of the display area, and spaced apart from upper and lower edges of the first and second substrates; and
        a plurality of second sealing portions extending in the second direction in which the first and second substrates are flat, adjacent to left and right portions of the display area, and spaced apart from left and right edges of the first and second substrate,
    wherein
    a number of the first sealing portions is more than a number of the second sealing portions,
    widths of the first sealing portions are greater than widths of the second sealing portions,
    the first sealing portions are connected to the second sealing portions,
    the first and second sealing portions connected to each other surround the display area, and
    a first width of a single first sealing portion is about 1.2 millimeters to about 2.0 millimeters, and a second width of a single second sealing portion is about 1 millimeter.

2. The display apparatus of claim 1, wherein the first and second substrates comprise long sides extended in the first direction and short sides extended in the second direction.

3. The display apparatus of claim 1, wherein
    a single one of the first sealing portions is in the non-display area adjacent to the upper portion of the display area,
    a single one of the first sealing portions is in the non-display area adjacent to the lower portion of the display area,
    a single one of the second sealing portions is in the non-display area adjacent to the left portion of the display area, and
    a single one of the second sealing portions is in the non-display area adjacent to the right portion of the display area.

4. The display apparatus of claim 3, wherein among the first sealing portions which are spaced apart from the respective edges of the first and second substrates, the first sealing portions have a same width.

5. The display apparatus of claim 3, wherein among the first sealing portions which are spaced apart from the respective edges of the first and second substrates, the first sealing portions have different widths.

6. The display apparatus of claim 1, wherein a ratio of the first width of the single first sealing portion to the second width of the single second sealing portion is in a range of about 1.2:1 to about 2.0:1.

7. The display apparatus of claim 1, wherein in a top plan view of, the first sealing portions comprise:
    a plurality of first sub-sealing portions in the non-display area adjacent to the upper portion of the display area and spaced apart from the respective edges of the first and second substrates; and a single one second sub-sealing portion in the non-display area adjacent to the lower portion of the display area and spaced apart from the respective edges of the first and second substrates, and among the first and second sub-sealing portions which are spaced apart from the respective edges of the first and second substrates, the width of the second sub-sealing portion and a sum of the widths of the first sub-sealing portions are each greater than the widths of each of the second sealing portions.

8. The display apparatus of claim 7, wherein the widths of the first sub-sealing portions are equal to the widths of the second sealing portions.

9. The display apparatus of claim 7, wherein the widths of the first sub-sealing portions are greater than the widths of the second sealing portions.

10. The display apparatus of claim 7, wherein the widths of the first sub-sealing portions are smaller than the widths of the second sealing portions.

11. The display apparatus of claim 1, wherein in a top plan view, the first sealing portions comprise:
a plurality of first sub-sealing portions in the non-display area adjacent to the upper portion of the display area and spaced apart from the respective edges of the first and second substrates; and
a plurality of second sub-sealing portions in the non-display area adjacent to the lower portion of the display area and spaced apart from the respective edges of the first and second substrates, and among the first and second sub-sealing portions which are spaced apart from the respective edges, a sum of widths of the first sub-sealing portions and a sum of widths of the second sub-sealing portions are each greater than the widths of each of the second sealing portions.

12. The display apparatus of claim 11, wherein a number of the first sub-sealing portions is different from a number of the second sub-sealing portions.

13. The display apparatus of claim 11, wherein the widths of the first sub-sealing portions are equal to the widths of the second sub-sealing portions.

14. The display apparatus of claim 11, wherein the widths of the first sub-sealing portions are different from the widths of the second sub-sealing portions.

15. The display apparatus of claim 11, wherein the widths of the first and second sub-sealing portions are equal to the widths of the second sealing portions.

16. The display apparatus of claim 11, wherein the widths of the first and second sub-sealing portions are greater than the widths of the second sealing portions.

17. The display apparatus of claim 11, wherein the widths of the first and second sub-sealing portions are smaller than the widths of the second sealing portions.

18. The display apparatus of claim 1, wherein the image display layer is a liquid crystal layer.

* * * * *